United States Patent [19]
Yanai et al.

[11] Patent Number: 5,335,352
[45] Date of Patent: Aug. 2, 1994

[54] RECONFIGURABLE, MULTI-FUNCTION DATA STORAGE SYSTEM CONTROLLER SELECTIVELY OPERABLE AS AN INPUT CHANNEL ADAPTER AND A DATA STORAGE UNIT ADAPTER

[75] Inventors: Moshe Yanai, Framingham; Natan Vishlitzky, Brookline; Bruno Alterescu, Newton; Daniel Castel, Framingham, all of Mass.

[73] Assignee: EMC Corporation, Hopkinton, Mass.

[21] Appl. No.: 587,253

[22] Filed: Sep. 24, 1990

[51] Int. Cl.⁵ .................... G06F 9/06; G06F 13/10; G06F 13/36; G06F 13/40
[52] U.S. Cl. .................... 395/800; 364/229.4; 364/229.5; 364/231.5; 364/232.9; 364/238; 364/238.1; 364/238.3; 364/239; 364/239.7; 364/239.9; 364/240.7; 364/240.5; 364/242.3; 364/242.91; 364/242.92; 364/242.93; 364/249.8; 364/251.7; 364/256.6; 364/260.3; 364/DIG. 1; 364/DIG. 2
[58] Field of Search ............... 395/800, 325, 375, 250, 395/275, 500, 200, 725, 775, 575; 364/DIG. 1, DIG. 2

[56] References Cited

U.S. PATENT DOCUMENTS

| | | | |
|---|---|---|---|
| 4,688,168 | 8/1987 | Gudaitis et al. | 395/325 |
| 4,709,329 | 11/1987 | Hecker | 395/275 |
| 4,780,808 | 10/1988 | Moreno et al. | 395/800 |
| 5,148,432 | 9/1992 | Gordon et al. | 371/10.1 |

Primary Examiner—Alyssa H. Bowler
Assistant Examiner—Daniel H. Pan
Attorney, Agent, or Firm—Daniel J. Bourque

[57] ABSTRACT

A reconfigurable, multi-function data controller for use in a data storage system is selectively adaptable for use as a data channel adapter or a storage device adapter. The controller includes a data channel interface having at least one independent, bi-directional channel interface, for transmitting and receiving commands, data and status with one or more host computers. At least one memory interface transmits and receives commands and data to and from at least one high speed semiconductor memory unit. Additionally, a data storage interface controls and transmits data to and from one or more data storage devices such as a disk drive. A multi-function controller director is coupled to the data channel interface, the at least one memory interface, and the data storage device interface, for directing the reconfigurable multi-function data controller to function as either a data channel adapter or as a storage device adapter in response to selected commands received by the director.

7 Claims, 2 Drawing Sheets

RECONFIGURABLE, MULTI-FUNCTION DATA STORAGE SYSTEM CONTROLLER SELECTIVELY OPERABLE AS AN INPUT CHANNEL ADAPTER AND A DATA STORAGE UNIT ADAPTER

FIELD OF THE INVENTION

This invention relates to data storage systems, and more particularly, to a reconfigurable, multi-function data controller selectively operable as a channel adapter and a data storage device adapter.

BACKGROUND OF THE INVENTION

Many large data storage systems such as the IBM 3390 storage system or other compatible systems employ two primary types of controller boards to interface one or more host computers with a plurality of direct access storage devices such as disk drives. The two controllers include a channel adapter, which serves as an interface between the disk storage system and one or more host computers, and a disk adapter which interfaces with one or more data storage devices such as disk drives. The channel adapter receives data and commands over one or more bi-directional channels from the host, and transmits data as well as storage system status information to the host whereas the disk adapter transfers data between the data storage system, cache memory, and the data storage devices.

Although each of these controller boards can be manufactured with little waste of hardware real estate or power consumption to achieve their specific function, each board is thus able to function only as one of the two required controller boards.

There are several negative features, however, of implementing only one function per controller board. These include the cost to the system user of stocking two different kinds of spare controller boards, as well as the manufacturing problems resulting from the requirement to produce, test and inventory two different controller boards. Thus, manufacturing costs as well as the costs of data storage system ownership could be drastically reduced with a single, multi-function controller board.

SUMMARY OF THE INVENTION

This invention features a reconfigurable, multi-function data controller for use in a data storage system. The reconfigurable, multi-function data controller of the present invention is selectively adaptable as either an input channel adapter or a data storage adapter in response to selected commands received by the data controller.

Such a reconfigurable, multi-function data controller includes a data channel interface having one or more independent, bi-directional channel interfaces, for receiving commands and data from one or more host computers, and for transmitting data and status information to the one or more hosts. At least one memory interface is provided, for transmitting and receiving commands and data to and from at least one semiconductor memory storage unit, and for transmitting and receiving data and commands to and from other multi-function data controllers.

The reconfigurable, multi-function data controller of the present invention also includes a data storage device interface, including one or more bi-directional data storage device interfaces and controllers, for transmitting and receiving data to and from one or more data storage devices, and for controlling one or more operations of the data storage device. Additionally, the data controller of the present invention includes a controller director, coupled to the data channel interface, the at least one memory interface, and the data storage device interface, for directing the reconfigurable, multi-function data controller to function as either a data channel adapter or as a storage device adapter in response to selected commands received by the controller.

BRIEF DESCRIPTION OF THE DRAWINGS

These and other features and advantages of the present invention are described below in the following detailed description and accompanying drawings, in which.

DETAILED DESCRIPTION OF THE INVENTION

Figure 1:
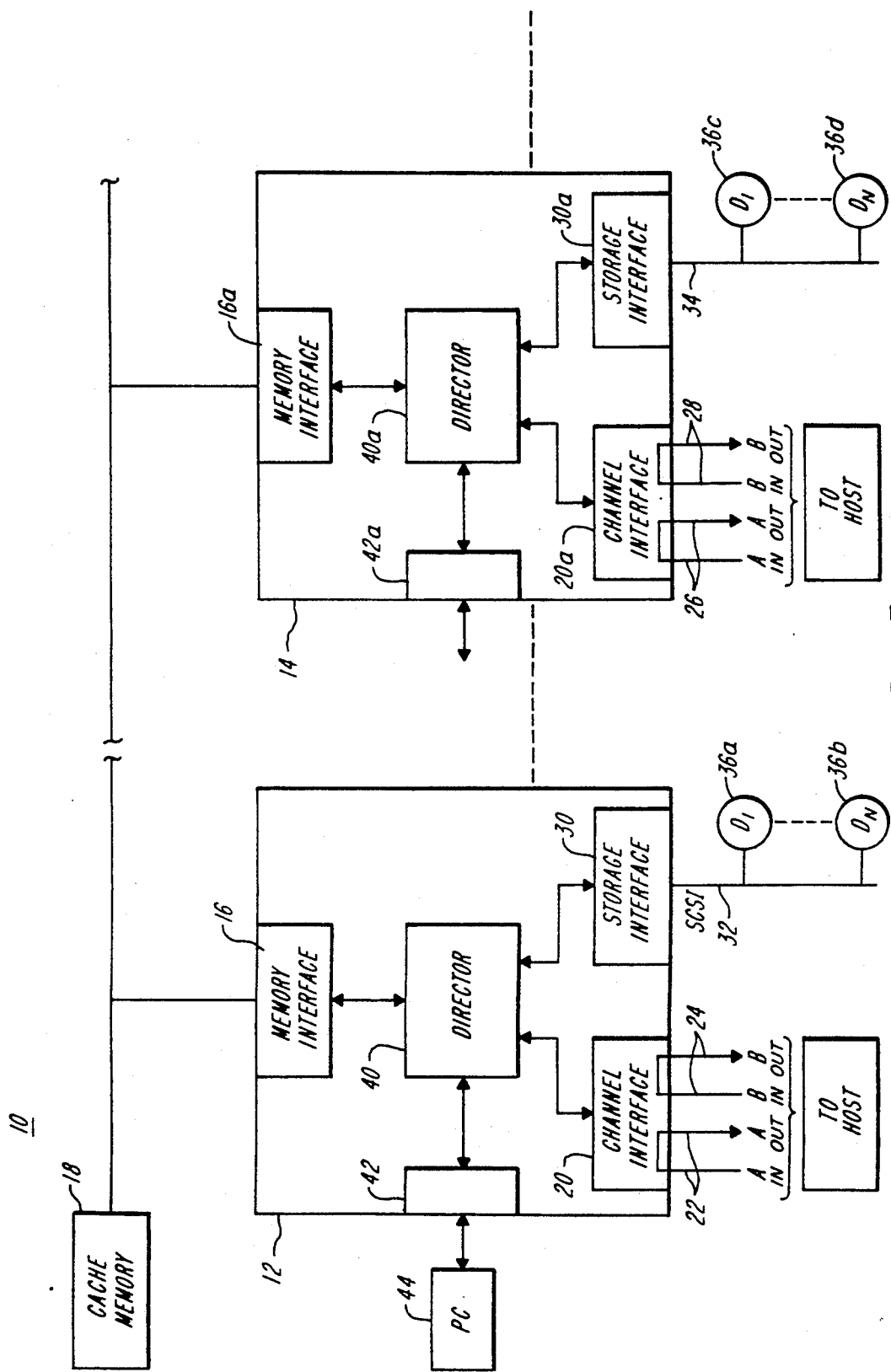
FIG. 1 is a block diagram of a disk storage system with the reconfigurable, multi-function data controller according to the present invention.

A data storage system 10, FIG. 1, is shown incorporating a plurality of reconfigurable, multi-function data controllers 12 and 14 according to the present invention. Each multi-function data controller such as controller 12 includes memory interface 16 adapted for transmitting data and commands to one or more high speed semiconductor cache memory units 18 and other multi-function data controllers such as controller 14 through its associated memory interface 16a.

The reconfigurable, multi-function data controller of the present invention also includes channel interfaces 20 and 20a. Each channel interface includes one or more independent, hi-directional channels 22–28, for receiving commands and data from one or more host computers 19 and 21, and for transmitting data and storage system status information to the connected host.

Also included in the reconfigurable, multi-function data controller of this invention are data storage interfaces 30, and 30a. Each data storage interface includes one or more storage device interfaces 32, 34 which typically comprise a small computer system interface (SCSI). The SCSI interface connects the storage interface with one or more storage devices such as disk drives 36a–36d.

Coupled to the memory interface, the channel interface, and the storage device interface of the multi-function data controller of the present invention is a data director 40,40a. The director serves as a controller and data path switch between the memory, channel and storage device interfaces, and controls the functionality of the multi-function data controller.

The function of the data controller as either a channel adapter or a disk adapter is selectively controllable by commands received by directors 40,40a. Such commands may be received through a communication interface 42,42a from an external device such as a personal computer 44 or other similar device capable of generating appropriate commands to the director. Alternatively, the director may receive commands for selectively controlling the operation of the multi-function data controller through memory interface 16,16a. In such a case, one of the multi-function data controllers 12,14 may serve as primary system controller, coordinating and controlling the functionality of the remainder of the multi-function data controllers. The functionality of the reconfigurable, multi-function data controller of the present invention may be thus dynamically altered by either an external device or another multi-function data controller in response to pre-established criteria such as the maintenance of a certain level of system performance.

For example, during certain periods of time or when processing particular data, system performance may be optimized by configuring one half of the number of multi-function data controllers as channel adapters, and the remaining data controllers as disk or storage device adapters.

During other periods of time or when processing different types of data, maintaining an adequate system performance level may require more channel adapters than disk adapters or vice versa. Additionally, a data storage system may employ system diagnostics to constantly monitor the status of each controller board. Should a channel adapter or storage device adapter fail, the system under its own direction, or at the direction of an external device such as a remotely connected personal computer, may reconfigure one or more of the multi-function data controllers of the present invention to operate as one or the other type of controller.

Figure 2:
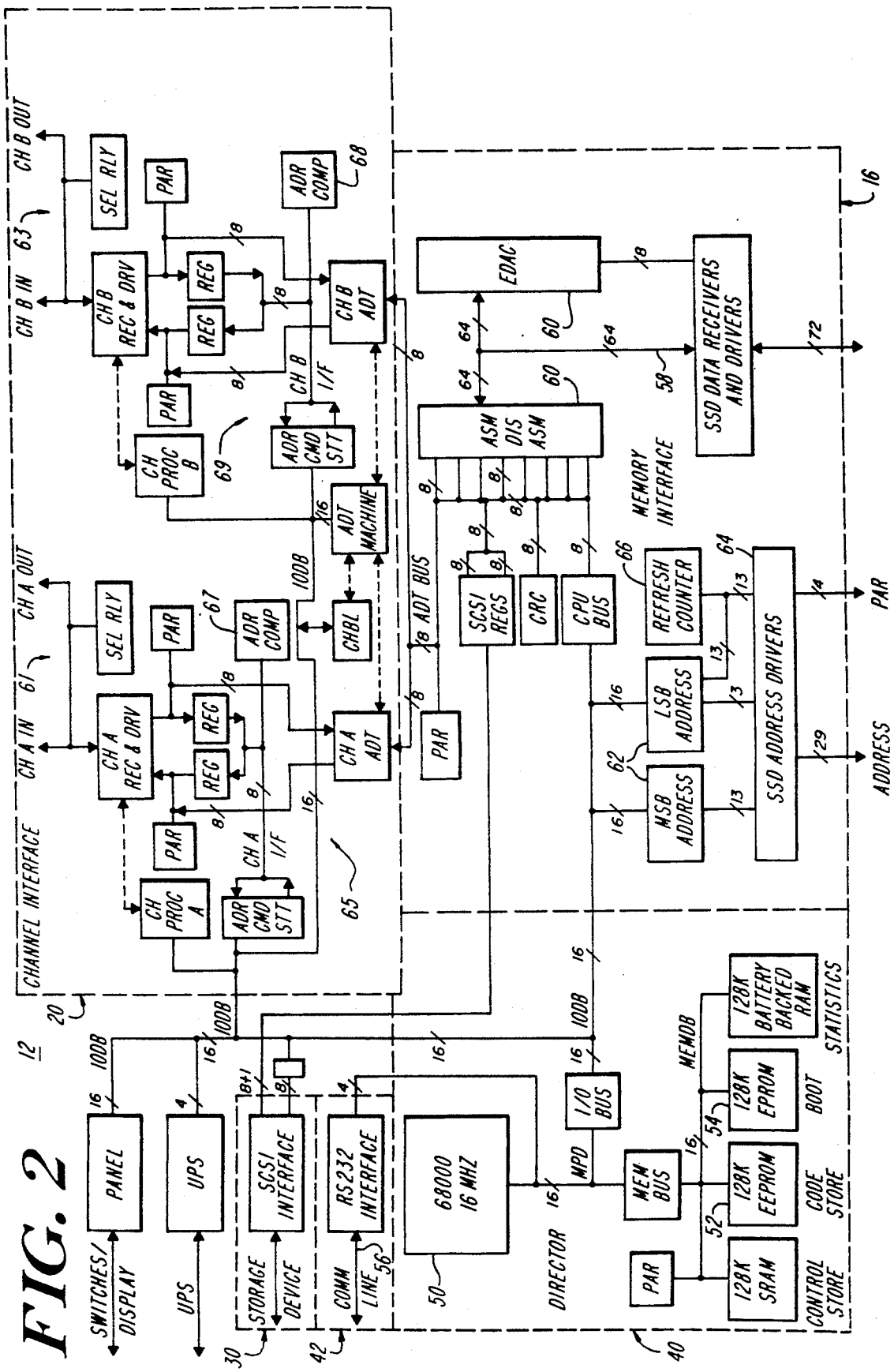
FIG. 2 is a more detailed schematic block diagram of the reconfigurable, multi-function data controller of the present invention.

A more detailed schematic block diagram of one reconfigurable, multi-function data controller 12 is shown in greater detail in FIG. 2. The multi-function data controller includes memory interface 16, channel interface 20, storage device interface 30, director 40, and communication port 42.

Director 40 operates under control of a CPU such as a Motorola 68000 microprocessor 50 operating under control of EEPROM 52 and EPROM 54. EEPROM 52 contains the code which microprocessor 50 executes to enable director 40 to control the functionality of the reconfigurable multi-function data controller 12. The code may be received over communication line 56 of communication interface 42 over internal memory interface data bus 58 from the memory interface. Memory interface 16 also includes error detection and control circuitry 60, address latches 62, address drivers 64 and DRAM refresh counter 66.

Channel interface 20 is also shown in greater detail and in this example, includes two bi-directional channels 61 and 63 labeled channel A and channel B respectively. In addition to well known drivers and receivers associated with each channel, each channel also includes an address comparator unit such as address comparators 67 and 68. Since each channel's input and output may be daisy chained with another channel on a channel interface of a different multi-function data controller, each channel includes an address comparator to determine whether commands and data received over the channel and accompanied by a device address in the case of a daisy chained system, are directed to a particular channel and channel adapter board. Additionally, each channel 61,63 of channel interface 20 includes circuitry 65 and 69 for providing automatic data transfer and data receipt to and from memory interface 16 and storage device interface 30 respectively.

Modifications and substitutions to the present invention by one of ordinary skill in the art are considered to be within the scope of the present invention which is not to be limited except by the claims which follow.

We claim:

1. A reconfigurable, multi-function data controller for use in a data storage system, and selectively adaptable for use as a data input channel adapter and as a data storage unit adapter, said reconfigurable, multi-function data controller comprising:

a data channel interface including at least one independent, bi-directional channel, for receiving commands and data from one or more host computers, and for transmitting data and status information to said one or more host computers;

at least one memory interface, for transmitting and receiving commands and data to and from at least one semiconductor memory storage area, and for transmitting and receiving commands and data to and from other multi-function data controllers;

a data storage device interface, including at least one bi-directional storage device interface, for controlling the transmission and reception of data to and from at least one connected data storage device; and a data controller director, coupled to the data channel interface, the at least one memory interface and to the data storage device interface, and selectively responsive to received commands, for directing the reconfigurable, multi-function data controller to function as, at a given time, one of a data input channel director and a data storage unit adapter, said data controller director responsive to at least a first command for reconfiguring said reconfigurable, multi-function data controller as a data input channel adapter by directing said data channel interface to engage for receiving commands and data from one or more host computers and by directing said data storage device interface to disengage, so as to configure said reconfigurable multi-function data controller to serve as a data input channel adapter, and responsive to at least a second command; for reconfiguring said reconfigurable, multi-function data controller as a data storage unit adapter by directing said storage device interface to engage for interfacing with one or more attached data storage devices and by directing said data channel interface to disengage, so as to configure said reconfigurable multi-function data controller to serve as a data storage unit adapter.

2. The system of claim 1 wherein said reconfigurable multi-function data controller receives said commands from a host computer.

3. The system of claim 1 wherein said reconfigurable multi-function data controller receives said commands from another reconfigurable, multi-function data controller.

4. The system of claim 1 further including a communication interface, for receiving said commands from an external source.

5. The system of claim 4 wherein said external source includes a microcomputer.

6. The system of claim 5 wherein said communication interface includes a modem connected to a telephone line, and wherein said microcomputer is located remotely from the data storage system and coupled to said communication interface by means of a telephone line.

7. The system of claim 1 wherein said data storage device interface includes a small computer system interface (SCSI).

* * * * *